US012640666B2

(12) United States Patent
Cunningham

(10) Patent No.: US 12,640,666 B2
(45) Date of Patent: May 26, 2026

(54) FULL-BRIDGE ACTIVE-SHORT-CIRCUIT OR DIODE-BLOCKING ACTIVE-SHORT-CIRCUIT APPARATUS, METHODS AND ARTICLES

(71) Applicant: EXRO TECHNOLOGIES INC., Calgary (CA)

(72) Inventor: Joshua Lee Cunningham, Chandler, AZ (US)

(73) Assignee: AESIRON TECHNOLOGIES INC., Calgary (CA)

( * ) Notice: Subject to any disclaimer, the term of this patent is extended or adjusted under 35 U.S.C. 154(b) by 139 days.

(21) Appl. No.: 18/229,130

(22) Filed: Aug. 1, 2023

(65) Prior Publication Data
US 2025/0047194 A1 Feb. 6, 2025

(51) Int. Cl.
*H02M 7/5387* (2007.01)
*H02M 1/32* (2007.01)
*H02P 3/22* (2006.01)

(52) U.S. Cl.
CPC ......... *H02M 7/5387* (2013.01); *H02M 1/325* (2021.05); *H02P 3/22* (2013.01)

(58) Field of Classification Search
CPC ........ H02M 1/325; H02M 7/5387; H02P 3/22
See application file for complete search history.

(56) References Cited

U.S. PATENT DOCUMENTS

2010/0256782 A1* 10/2010 Dai ........................... H02P 6/14
700/14
2019/0348936 A1* 11/2019 Lin ........................ H02K 19/26

* cited by examiner

*Primary Examiner* — Jue Zhang
(74) *Attorney, Agent, or Firm* — Cozen O'Connor

(57) ABSTRACT
Apparatus, methods and articles implement active short circuit (ASC) or diode blocking ASC using a full bridge, alternating between halves (low side, high side) for implementing the ASC via strategic switching of the full bridge. Current is circulated through an inductor, low DC voltage rail with low side switches ON. Current then circulated through the inductor, low DC voltage rail via a diode across an OFF low side switch, with one low side switch ON and one OFF. Current is then passed through the inductor from high side to low side voltage rails via a high and a low side switch in ON states. Current is then circulated through the inductor, high DC voltage rail via a diode across an OFF high side switch, with one high side switch ON and one OFF. Current is the circulated through the inductor, high DC voltage rail with the high side switches ON.

22 Claims, 7 Drawing Sheets

FULL-BRIDGE ACTIVE-SHORT-CIRCUIT OR DIODE-BLOCKING ACTIVE-SHORT-CIRCUIT APPARATUS, METHODS AND ARTICLES

TECHNOLOGICAL FIELD

This disclosure is generally related to power converter circuits, for example circuits that invert, rectify and/or adjust voltages, for instance for use with rotating electric machines (e.g., electric motors and/or generators), and more particular to handling of fault conditions via control of switches of a bridge circuit via improvements to active-short-circuit techniques.

BACKGROUND

Power converter circuits can be employed for various applications, for instance employed with rotating electric machines such as electric motors and or generators. In some applications, a power converter circuit can take the form of, or be operated as, an inverter to invert a direct current (DC) from a DC power source (e.g., battery cells, fuel cells, super- or ultra-capacitor cells) to an alternating current (AC) to drive an electric motor (e.g., single phase, three phase). In some applications, a power converter circuit can be operated as a rectifier (e.g., passive rectifier, active rectifier) to rectify AC from a generator or electric motor operating in a regenerative braking mode to DC, for example to store in a power storage device (e.g., battery cells, fuel cells, super- or ultra-capacitor cells). In some applications, a power converter circuit can be operated to adjust a voltage. These power converters can employ a bridge circuit, comprised of switches (e.g., transistors) in a bridge configuration. For power applications, the switches of the bridge typically take the form of metal oxide semiconductor field effect transistors (MOSFETs) or integrated gate bipolar junction transistors (IGBTs).

Active Short Circuit (ASC) techniques provide a solution to render electric motor operation safe. ASC is a preferred response to many faults that can occur, as ASC prevents unintended motoring or regeneration torque, as well preventing any current to pass between the rotating electric machine (e.g., 3-phase electric motor) and the DC-bus, and thereby protecting a power source (e.g., traction battery) and/or other components of an electric vehicle.

There have been numerous attempts at half-bridge ASC implementations. Typically applications of ASC turn OFF all the high side or upper-bridge switches and turn ON all the low side or lower-bridge switches. This effectively shorts the motor phases together. However, if the motor has a magnetized rotor and is rotating, then there will be an induced voltage on the stator phases, and thus circulating current.

The ASC currents can be significant. The current can exceed the root mean square (RMS) capacity of the low side or lower-bridge switches of the bridge (e.g., lower half of the bridge). Where ASC current magnitudes exceed the capabilities the switches of the low side or lower-bridge half of the bridge, overheating and permanent damage to those switches can occur, resulting in failure.

BRIEF SUMMARY

Given the potential for the ASC currents to exceed the RMS capacity of the low side or lower-bridge switches, the inventor has determined that it is desirable to use the entire bridge to effectively half the RMS current each switch must carry.

However, switching between lower and upper bridge activation would require dead time when both high side or upper-bridge and low side or lower-bridge switches are OFF to prevent the possibility of occurrence of a shoot-through condition. During the dead time, current will diode-rectify back to the DC-bus, resulting in either a small amount of regeneration current, or if the DC-bus is no longer connected due to activation of a contactor or a fuse, then the DC-link capacitor voltage will rise. Unmitigated, the capacitor voltage could reach damaging levels. Thus, if using the full-bridge to handle ASC, then uncontrolled diode-rectified currents would have a path from the motor (e.g., three phase electric motor with permanent magnets) to the DC-bus, causing unintended regeneration current and/or a rise in DC-bus voltage.

However, by strategically sequencing switches of the full bridge (e.g., the coil-driver or inverter), the full bridge can be used to conduct ASC without rectifying current to the DC-bus. The apparatus and methods described herein can advantageously be used with any 3-phase inverter and is not specific to Exro Coil Driver™ products.

By sequencing the bridge switches strategically, the switch diodes can be utilized to allow opposing switch operation without requiring the dead time, effectively blocking current from rectifying to the DC bus.

The approaches described herein advantageously increase the number or capability of the switches of a bridge circuit to handle the excess currents by alternatingly employing both (high or upper, low or lower) halves of the full bridge circuit. This approach advantageously eliminates the need to overbuild inverters to handle the ASC currents, because the load is carried by the full bridge during ASC instead of only by the half-bridge. This approach also advantageous lowers the bill of materials (BOM) costs of the power converter (aka coil-driver or inverter) by allowing selection of transistors (MOSFETs/IGBTs) without considering overburdening due to half-bridge ASC limitations. These approaches also advantageously improve the robustness of the power converter to failure. These approaches further advantageously allow extended time in ASC, which could be a requirement of functional safety (ISO-26262) and/or of potential customers. The resulting power converter can thus handle the same magnitude of currents in ASC as in normal operation (i.e., in absence of fault condition or error, for instance loss of control of the motor).

BRIEF DESCRIPTION OF THE DRAWINGS

In the drawings, identical reference numbers identify similar elements or acts. The sizes and relative positions of elements in the drawings are not necessarily drawn to scale. Further, the particular shapes of the elements as drawn are not intended to convey any information regarding the actual shape of the particular elements, and have been solely selected for ease of recognition in the drawings. The various embodiments are illustrated by way of example and not by way of limitation in the accompanying Figures.

DETAILED DESCRIPTION

In the following description, certain specific details are set forth in order to provide a thorough understanding of various disclosed embodiments. However, one skilled in the relevant art will recognize that implementations or embodiments may be practiced without one or more of these specific details, or with other methods, components, materials, etc. In other instances, well-known structures associated with electric machines (e.g., electric motors, generators), control systems, and/or power conversion systems (e.g., inverters, rectifiers, DC-DC converters) have not been shown or described in detail to avoid unnecessarily obscuring descriptions of the implementations or embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or to "one embodiment" or "an embodiment" means that a particular feature, structure or characteristic described in connection with the implementation or embodiment is included in at least one implementation or at least one embodiment. Thus, the appearance of the phrases "in one implementation" or "in an implementation" or "in one embodiment" or "in an embodiment" in various places throughout this specification are not necessarily all referring to the same implementation or to the same embodiment. Furthermore, the particular features, structures, or characteristics may be combined in any suitable manner in one or more implementations or one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in this specification and the appended claims, the terms "module" or "modules" when not immediately preceded by "program" or "logic" means circuitry (e.g., processor for instance a microprocessor, microcontroller, central processing unit (CPU), CPU core, graphics processing unit (GPU), digital signal processor (DSP), application specific integrated circuit (ASIC), field programmable gate array (FPGA)) that executes logic (e.g., a set of instructions or algorithm) defined in hardware, software and/or firmware.

As used in this specification and the appended claims, the terms "program module" or "program modules" means logic that can be executed in the form of a set of instructions or an algorithm stored in nontransitory media.

Figure 1:
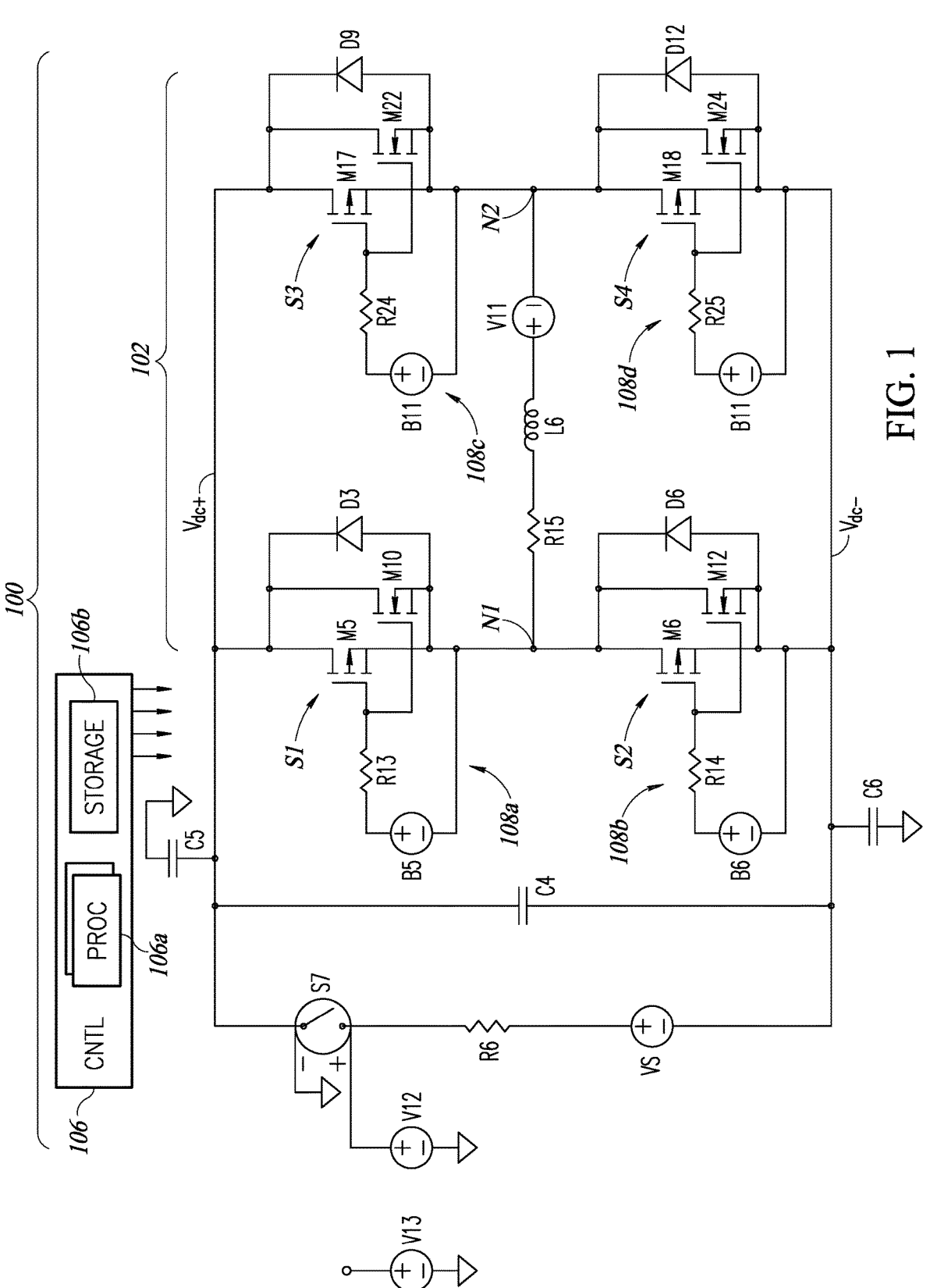
FIG. 1 is a schematic diagram of a system comprising a full bridge circuit, inductor, and a control circuit coupled to control operation of the switches of the full bridge circuit, and in particular to control operation of the switches to alternate between operating a first half of the bridge circuit as an active short circuit (ASC) and a second half of the bridge circuit as an ASC, for instance without a dead time therebetween, in response to occurrence of a fault condition, according to at least one illustrated implementation.

FIG. 1 shows a system 100 comprising a full bridge circuit 102, inductor L6, and a control circuit 106 coupled to control operation of switches of the full bridge circuit 102, according to at least one illustrated implementation.

The full bridge circuit 102 includes four sets of switches, a first set of switches S1, a second set of switches S2, a third set of switches S3, and a fourth set of switches S4 arranged in a bridge topology or architecture. In this illustrated implementation, the first set of switches S1 includes two metal oxide semiconductor field effect transistors M5, M10 (MOSFETs) electrically coupled in parallel with each other, the second set of switches S2 includes two MOSFETs M6, M12 electrically coupled in parallel with each other, the third set of switches S3 includes two MOSFETs M17, M22 electrically coupled in parallel with each other, and the fourth set of switches S4 includes two MOSFETs M18, M24 electrically coupled in parallel with each other. The first set of switches S1, the second set of switches S2, the third set of switches S3, and the fourth set of switches S4 each have a respective diode D3, D6, D9, D12, respectively, electrically coupled thereacross to allow reverse conduction. While illustrated as MOSFETs, the first set of switches S1, second set of switches S2, third set of switches S3 and fourth set of switches S4 can each employ one or more integrated gate bipolar junction transistors (IGBTs), Si BJTs, Si FETs, SiC FETs, GAN HETs, etc. The diodes D3, D6, D9, D12 will typically take the form of a body diode of respective ones of the first, the second, the third and the fourth set of switches S1-S4, although discrete diodes that are distinct from the switches could be employed. The diodes D3, D6, D9, D12 can, for example, take the form of freewheeling didoes electrically coupled in antiparallel across respective ones of the first set of switches S1, second set of switches S2, third set of switches S3 and fourth set of switches S4 to allow reverse conduction with respect to the first set of switches S1, second set of switches S2, third set of switches S3 and fourth set of switches S4.

The first set of switches S1 and the third set of switches S3 are each electrically coupled to a first voltage rail (e.g. high DC-bus rail Vdc+) of a DC-bus (high DC-bus rail Vdc+ and low DC-bus rail Vdc−). The second set of switches S2 and the fourth set of switches S4 are each electrically coupled to a second voltage rail (e.g., low DC-bus rail Vdc−) of the DC-bus (DC-bus rail Vdc+ and low DC-bus rail Vdc−). The first set of switches S1 and the second set of switches S2 are electrically coupled to one another at a first node N1. The third set of switches S3 and the fourth set of switches S4 are electrically coupled to one another at a second node N2. Two sets of switches S1, S3 form a first half (e.g., high-side or upper-bridge) of the full bridge circuit 102 and two sets of switches S2, S4 form a second half (e.g., low-side or lower-bridge) of the full bridge circuit 102. Control lines electrically couple drive signals to respective gates of the switches, for example via gate drivers (e.g., gate drive circuitry 108a, 108b, 108c, 108d).

The DC-bus Vdc+, Vdc− is supplied via a voltage source VS. A DC link voltage is represented by a capacitance C4 coupled across the rails of the DC-bus Vdc+, Vdc−, in parallel with the voltage source VS. Optionally, a contactor or relay S7 can be included to allow the voltage source VS to selectively be electrically coupled to, and electrically coupled from, the DC-bus Vdc+, Vdc–.

At least one inductor L6 is electrically coupled between the first node N1 and the second node N2. A resistance R6 is illustrated electrically coupled in series with the at least one inductor L6, between the first node N1 and the second node N2. The resistance R6 can be the inherent resistance associated with the at least one inductor L6. The at least one inductor L6 can, for example, take the form of at least one winding or at least one winding of a coil of one phase of a rotating electric machine. While only a single phase is illustrated, the circuitry of FIG. 1 can be replicated to provide control of a multi-phase rotating electric machine, for example a 3 phase electric motor (e.g., three phase electric motor with permanent magnets), for instance of an electric vehicle, for instance allowing the phases to be shorted in response to a fault.

The control circuit 106 can include one or more processors 106a (i.e., circuitry) and one or more nontransitory processor-readable media 106b communicatively coupled to the one or more processors 106a. The one or more processors 106a can be any logic processing units, such as one or more microcontrollers, central processing units (CPUs), processing cores, graphics processing units (GPUs), digital signal processors (DSPs), field programmable gate arrays (FPGAs), application-specific integrated circuits (ASICs), programmable logic controllers (PLCs), etc. The one or more nontransitory processor-readable media 106b can include nonvolatile memory, volatile memory, and/or storage media (e.g., spinning storage media). The one or more nontransitory processor-readable media 106b can, for example, include read-only memory ("ROM"), random access memory ("RAM"), FLASH memory, electrically erasable programmable read only memory (EEPROM), hard disk drive (HDD) for reading from and writing to a magnetic disk, a solid state drive (SSD, e.g., flash memory) for reading from and writing to solid-state memory, and/or an optical disk drive (ODD) for reading from and writing to optical disks. The control circuit 106 may also include any combination of such drives in various different embodiments. The control circuit 106 can include one or more interfaces or controllers (not shown), for example, communicatively coupled between the one or more nontransitory processor-readable media 106b and the one or more processors 106a, for instance via a system bus. The one or more nontransitory processor-readable media 106b store computer- or processor-readable and/or computer- or processor-executable instructions, data structures, program modules and other data, which when executed by the one or more processors 106a controls operation the control circuit 106, for example to execute the algorithms and operations described herein. Those skilled in the relevant art will appreciate that other types of computer-readable media that can store data accessible by a computer may be employed, such as WORM drives, RAID drives, magnetic cassettes, digital video disks ("DVD"), Bernoulli cartridges, RAMs, ROMs, smart cards, etc. Optionally, a basic input/output system ("BIOS"), which can be stored by a ROM, contains basic routines that help transfer information between elements within the control circuit 106, such as during start-up.

The control circuit 106 can in particular control operation of the switches of the full bridge circuit 102 to alternate between operating a one half of the bridge circuit 102 as an active short circuit (ASC) and the operating the other half of the bridge circuit 102 as an ASC, preferably without a dead time therebetween, in response to occurrence and/or detection of a fault condition. The control circuit 106 can, for example, be communicatively coupled to provide control signals to the gate drive circuitry 108a, 108b, 108c, 108d in order to drive the first set of switches S1, the second set of switches S2, the third set of switches S3 and the fourth set of switches S4 in sequences as described herein.

The control circuit 106 can monitor operation for occurrence of a fault. On detecting a fault or on receiving an indication that fault has occurred, the control circuit 106 can control operation of the full bridge circuit 102 to first implement ASC using one half (e.g., low-side) of full bridge circuit 102 then implement ASC using the other half (e.g., high-side) of the full bridge circuit 102. Such may advantageously switch halves (e.g., low-side→high-side→low-side . . . ) of the full bridge circuit 102, preferably without dead time between the switching of the halves of the full bridge circuit 102.

With reference to the schematic diagram of FIG. 1, operation will be described with the assumption that in the starting state the second set of switches S2 (switch M6, switch M12) and the fourth set of switches S4 (switch M18, switch M24) are in the ON state and the first set of switches S1 (switch M5, switch M10) and third set of switches S3 (switch M17, switch M22) are in the OFF state. This corresponds to a low-side ASC condition. However, the operation could just as well have employed a starting state using a high-side ASC condition. It is also assumed that in this starting state there is a sinusoidal current circulating a loop formed by the second set of switches S2, inductor L6, fourth set of switch S4, and the low-side (bottom) voltage rail Vdc–.

In order to move the ASC currents path from the low-side of the full bridge circuit 102 to the high-side of the full bridge circuit 102, the state of the four sets of switches (first set of switches S1, second set of switches S2, third set of switches S3, fourth set of switches S4) are changed in a specified sequence in order to prevent conduction of current back to the DC-link C4.

Thus, for example, the control circuit 106 can start by setting a state of the switches to the above described starting state, to cause current to circulate through the second set of switches S2, the inductor L6, the fourth set of switches S4, and the second DC voltage rail (e.g., low DC voltage rail Vdc–).

Next, the control circuit 106 can set a state of the switches to cause current to circulate through a diode D6 across the second set of switches S2, the inductor L6, the fourth set of switches S4, and the second voltage rail (e.g., low DC voltage rail Vdc–).

Next, the control circuit 106 can set a state of the switches to cause current to pass through the first voltage rail (e.g., high DC voltage rail Vdc+), the first set of switches S1, the inductor L6, the fourth set of switches S4, and the second voltage rail (e.g., low DC voltage rail Vdc–).

Next, the control circuit 106 can set a state of the switches to cause current to circulate through the first set of switches S1, the inductor L6, a diode D9 across the third set of switches S3, and the first voltage rail (e.g., high DC voltage rail Vdc+).

Next, the control circuit 106 can set a state of the switches to cause current to circulate through the first set of switches S1, the inductor L6, the third set of switches S3, and the first voltage rail (e.g., high DC voltage rail Vdc+).

The control circuit 106 can execute additional cycles of switching, alternating between implementing ASC on the high-side or upper-bridge and the low-side or lower-bridge of the full bridge circuit 102. While illustrated as employing the low side first (e.g., low DC voltage rail Vdc– first) for circulation of current, some implementations can first employ the high side (e.g., high DC voltage rail Vdc+ first) for circulation of current.

The switching operation advantageously avoids a shoot-through condition (e.g., a short between the high DC voltage rail Vdc+ and low DC voltage rail Vdc– without passing though the inductor and/or where the current is not sourced from the DC-link capacitor C4). The ASC concept can be applied to a typical 3-phase brushless motor (wye or delta connected). The sequence of operations does not change between open-winding motor and more typical motors. The arbiter of which switches (e.g., transistors) to start the sequence is the direction of the coil current, which applies equally to any brushless motor type.

Figure 2:
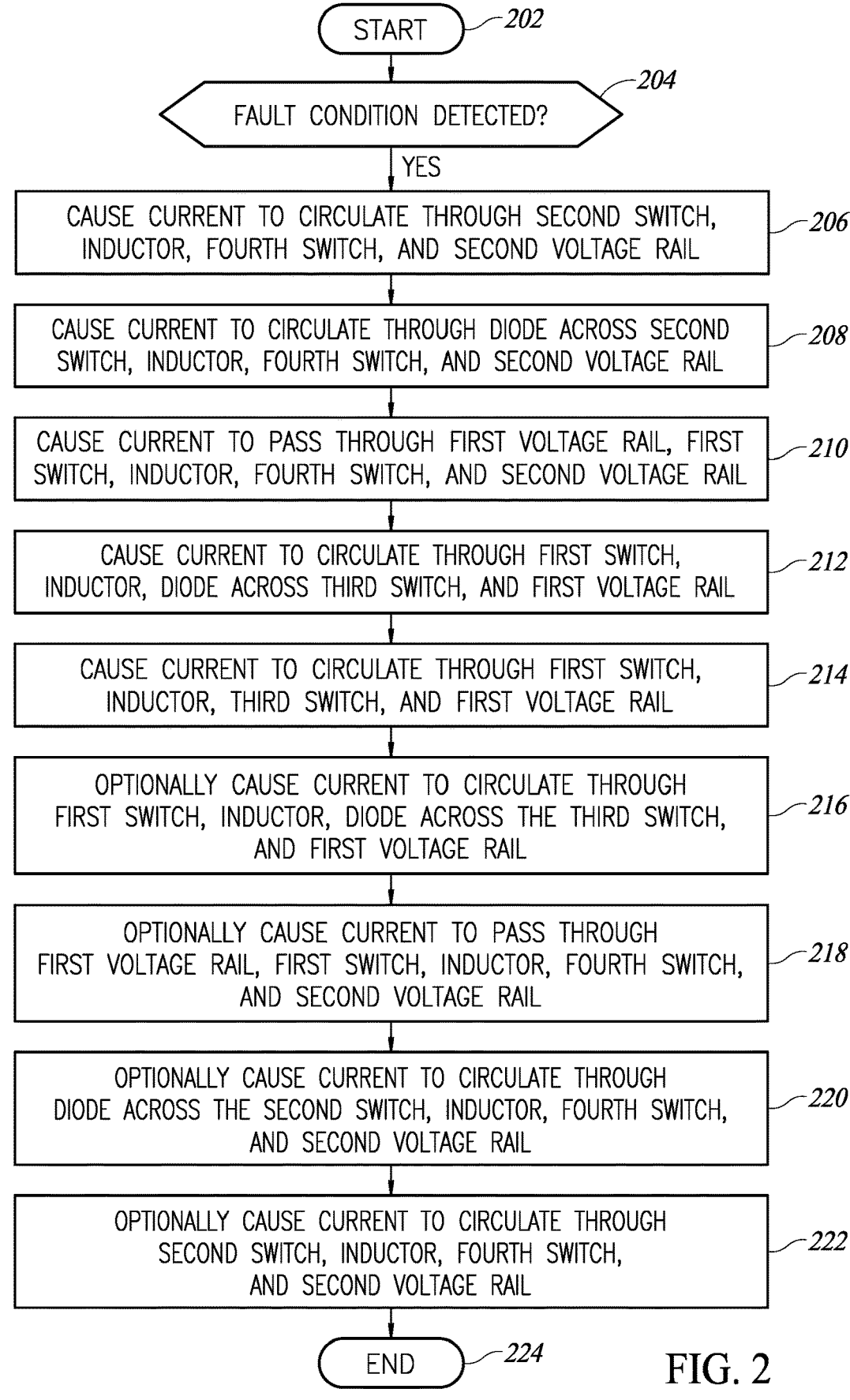
FIG. 2 is a flow diagram of a method of operation executed, for example, by the system of FIG. 1, according to at least one illustrated implementation.

FIG. 2 shows a method 200 of operation executed, for example, by the system 100 of FIG. 1, according to at least one illustrated implementation.

Logic for executing the method 200 can, for example, take the form of software and/or firmware processor-executable instructions stored on one or more nontransitory processor-readable media (e.g., nonvolatile memory for instance read only memory (ROM), electrically erasable programmable read only memory (EEPROM) or FLASH memory; volatile memory for instance random access memory (RAM); or spinning storage media for instance spinning magnetic disk or spinning optical disk, or any other type of storage media). Additionally or alternatively, logic for executing the method 200 can be encoded or embedded in hardware for instance in an ASIC or other dedicated integrated circuit.

The method 200 starts at 202, for example in response to a powering ON of the system 100 (FIG. 1) or in response to a call from a call routine or other invocation.

At 204, a control circuit 106 (FIG. 1) determines whether a fault condition has been detected or occurred. The control circuit 106 can monitor values of various parameters (e.g., currents, voltages) for various type of faults (e.g., overvoltage). In some implementations, the control circuit 106 (FIG. 1) can be communicatively coupled to one or more sensors (e.g., current sensors, voltage sensors, rotary encoders, Reed switches) to receive signals indicative of the values of the monitored parameters.

Figure 3A:
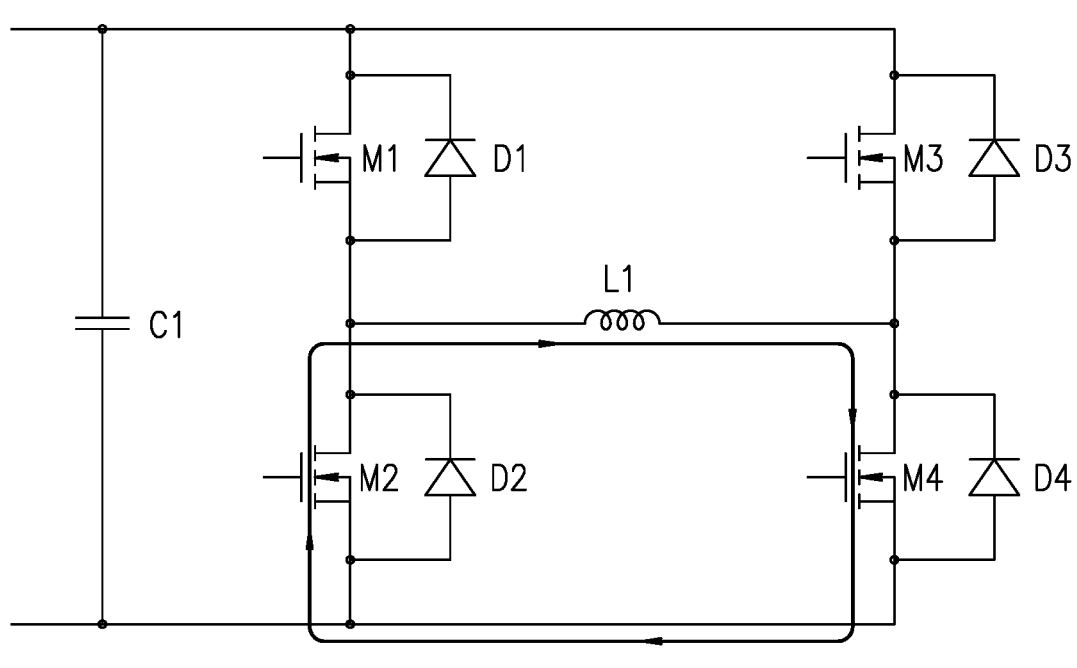
FIGS. 3A, 3B, 3C, 3D and 3E are schematic diagrams of a bridge circuit and inductor, illustrating sequential acts of a drive sequence to drive switches of a bridge circuit to advantageously implement a full-bridge active-short-circuit (ASC) of an electric motor (only a single phase illustrated), alternating between implementing the ASC with a first half of the bridge circuit at one time and implementing the ASC with a second half of the bridge circuit at another time, preferably with no dead time therebetween, according to a least one illustrated implementation.

At 206, the control circuit 106 (FIG. 1) can set a state of the switches to cause current to circulate through second switch, inductor, fourth switch, and second voltage rail, for example as illustrated by the arrow in FIG. 3A. For example, the control circuit 106 can generate control signals to control operation of one or more gate drives to control the states of each of the first set of switches S1, the second set of switches S2, the third set of switches S3 and the fourth set of switches S4 as described herein (e.g., FIG. 3A).

Figure 3B:
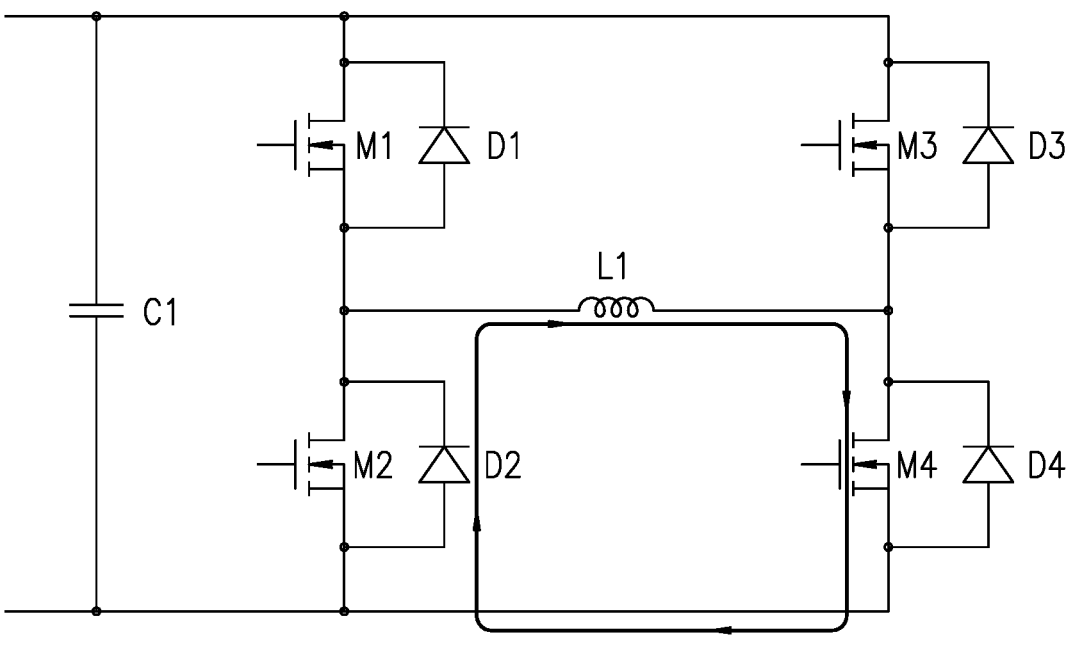

At 208, the control circuit 106 (FIG. 1) can set a state of the switches to cause current to circulate through a diode across the second switch, inductor, fourth switch, and second voltage rail, for example as illustrated by the arrow in FIG. 3B. For example, the control circuit 106 can generate control signals to control operation of one or more gate drives to control the states of each of the first set of switches S1, the second set of switches S2, the third set of switches S3 and the fourth set of switches S4 as described herein (e.g., FIG. 3B).

Figure 3C:
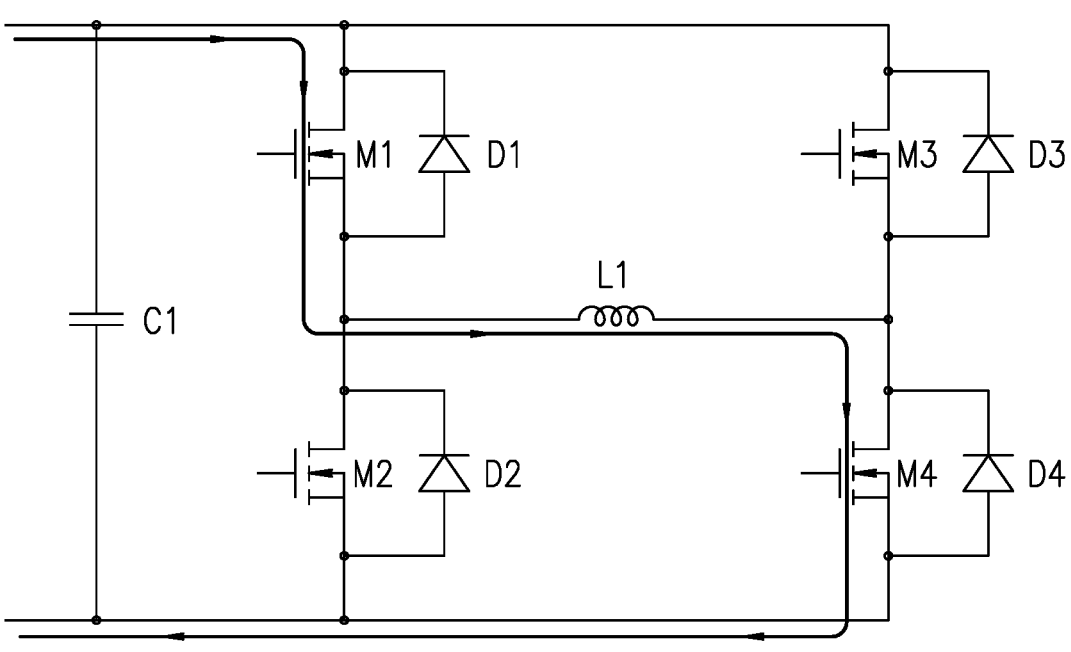

At 210, the control circuit 106 (FIG. 1) can set a state of the switches to cause current to pass through first voltage rail, first switch, inductor, fourth switch, and second voltage rail, for example as illustrated by the arrow in FIG. 3C. For example, the control circuit 106 can generate control signals to control operation of one or more gate drives to control the states of each of the first set of switches S1, the second set of switches S2, the third set of switches S3 and the fourth set of switches S4 as described herein (e.g., FIG. 3C).

Figure 3D:
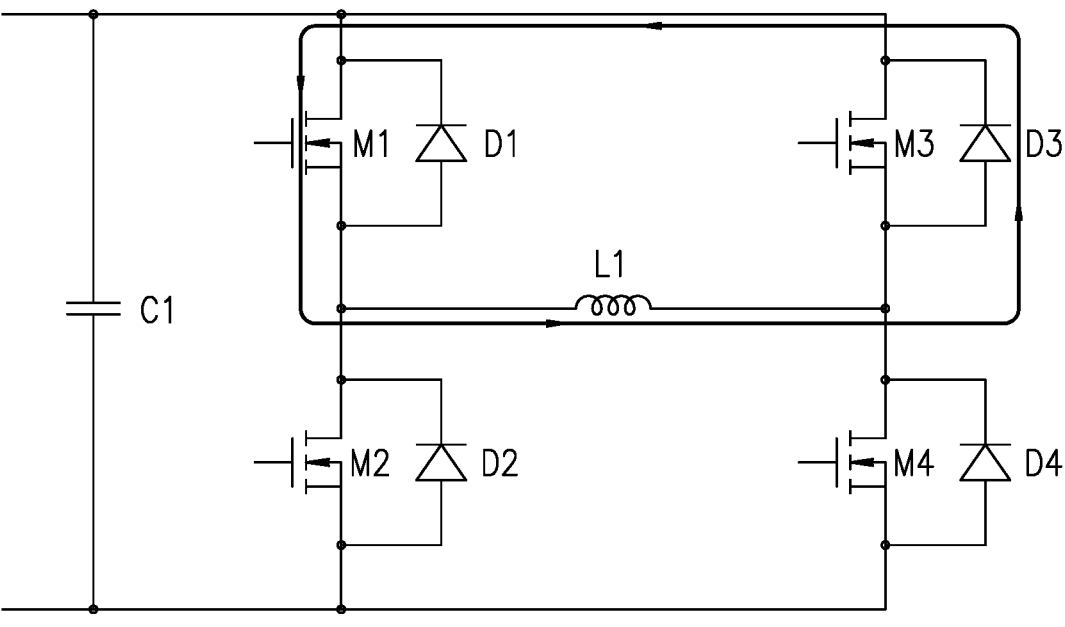

At 212, the control circuit 106 (FIG. 1) can set a state of the switches to cause current to circulate through first switch, inductor, diode across third switch, and first voltage rail (e.g., Vdc+), for example as illustrated by the arrow in FIG. 3D. For example, the control circuit 106 can generate control signals to control operation of one or more gate drives to control the states of each of the first set of switches S1, the second set of switches S2, the third set of switches S3 and the fourth set of switches S4 as described herein (e.g., FIG. 3D).

Figure 3E:
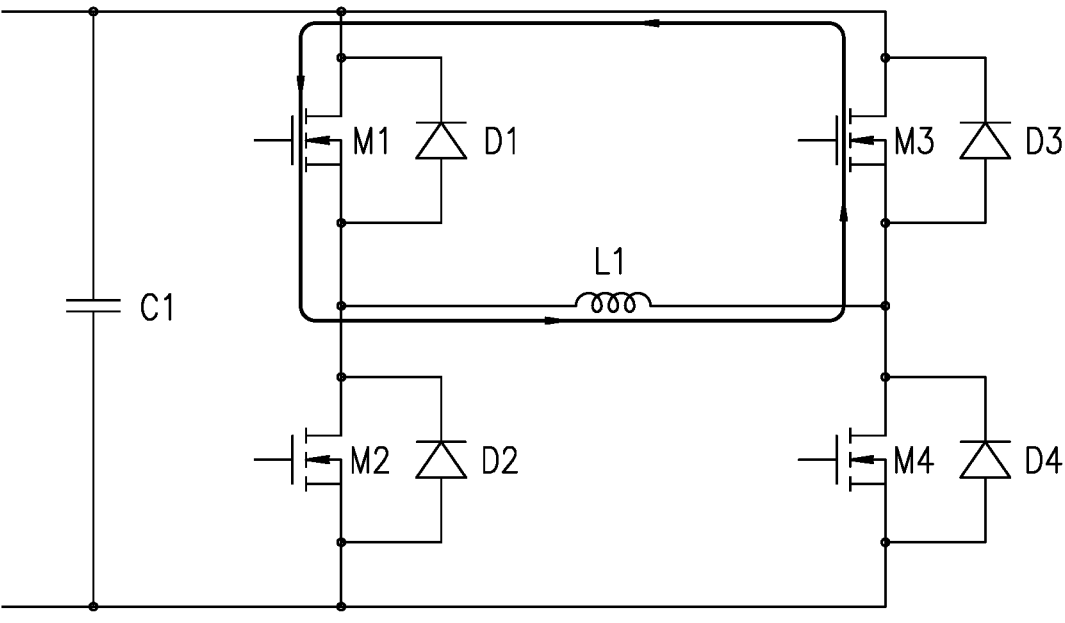

At 214, the control circuit 106 (FIG. 1) can set a state of the switches to cause current to circulate through first switch, inductor, third switch, and first voltage rail, for example as illustrated by the arrow in FIG. 3E. For example, the control circuit 106 can generate control signals to control operation of one or more gate drives to control the states of each of the first set of switches S1, the second set of switches S2, the third set of switches S3 and the fourth set of switches S4 as described herein (e.g., FIG. 3E).

A minimum time for maintain the diode conduction (e.g., FIGS. 3B and 3D) would be the same amount of time as the switching time of the switch device. For instance, where the switches are implemented by IGBTs the minimum time might be around 1 uS to around 2 uS. For instance, where the switches are implemented by SiC FETs would likely be less than around 1 uS.

For conduction between the DC voltage rails, (e.g., FIG. 3C), generally the longer time spent in this mode or configuration, the more charge is pulled from the DC-link capacitor (or DC-bus). However, too much time could result in unintended torque production. One can adjust the timing to achieve a desired balance between drawing charge while minimizing unintended torque production.

The switch between lower bridge and upper bridge (or back) can be done performed at any frequency that is compatible with the minimum time constraint for the diode conduction configuration or mode described above. However, it is likely desirable to reduce the switching frequency as that reduces switching loss, and improves the current carrying capability of the switches (i.e., less total heat generated). For example, a reduction in switching frequency would be to operate at 1/10th the normal operation frequency, but other reductions could be employed in order to match other design specifications, for instance a specified minimum switching frequency due to bootstrapped gate-drivers).

Optionally at 216, the control circuit 106 (FIG. 1) causes current to circulate through first switch, inductor, diode across the third switch, and first voltage rail. For example, the control circuit 106 can generate control signals to control operation of one or more gate drives to control the states of each of the first set of switches S1, the second set of switches S2, the third set of switches S3 and the fourth set of switches S4 as described herein.

Optionally at 218, the control circuit 106 (FIG. 1) causes current to pass through first voltage rail, first switch, inductor, fourth switch, and second voltage rail. For example, the control circuit 106 can generate control signals to control operation of one or more gate drives to control the states of each of the first set of switches S1, the second set of switches S2, the third set of switches S3 and the fourth set of switches S4 as described herein.

Optionally at 220, the control circuit 106 (FIG. 1) causes current to circulate through diode across the second switch, inductor, fourth switch, and second voltage rail. For example, the control circuit 106 can generate control signals to control operation of one or more gate drives to control the states of each of the first set of switches S1, the second set of switches S2, the third set of switches S3 and the fourth set of switches S4 as described herein.

Optionally at 222, the control circuit 106 (FIG. 1) causes current to circulate through second switch, inductor, fourth switch, and second voltage rail. For example, the control circuit 106 can generate control signals to control operation of one or more gate drives to control the states of each of the first set of switches S1, the second set of switches S2, the third set of switches S3 and the fourth set of switches S4 as described herein.

At 224, the method 200 can terminate until started or invoked again. In some implementations, the method 200 can instead repeat periodically or aperiodically during operation of the system 100 (FIG. 1).

FIGS. 3A, 3B, 3C, 3D and 3E illustrate sequential configurations of a bridge circuit controlled by a drive sequence to drive the switches thereof to advantageously implement a full-bridge active-short-circuit (ASC) of a phase of an electric motor, alternating between implementing the ASC with a first half of the bridge circuit at one time and implementing the ASC with a second half of the bridge circuit at another time, preferably with no dead time therebetween, according to a least one illustrated implementation. FIGS. 3A, 3B, 3C, 3D and 3E illustrate, for example, the configuration in response to acts 206, 208, 210, 212 and 214, respectively, of FIG. 2.

In particular, FIG. 3A shows a full bridge circuit during a first time or period, in which both second switch (e.g., MOSFETs) M2 and a fourth switch M4 of one half (e.g., low-side half) of the full bridge circuit are in an ON state and concurrently both a first switch M1 and a third switch M3 of another half (e.g., high-side half) of the full bridge circuit are in an OFF state. As illustrated in FIG. 3A, this causes current to circulate through the second switch M2, the motor coil (inductor L1), the fourth switch M4, and one DC-bus rail (e.g., the lower DC-bus rail) as indicated by the arrow.

FIG. 3B shows the full bridge circuit during a second time or period, in which the fourth switch M4 is in an ON state, and concurrently all of the first switch. M1, the second switch M2, and the third switch M3 are in an OFF state. As illustrated in FIG. 3B, this causes current to circulate through a diode D2 across the second switch M2, the motor coil (inductor L1), the fourth switch M4, and the one DC-bus rail (e.g., the lower DC-bus rail) as indicated by the arrow.

FIG. 3C shows the full bridge circuit during a third time or period, in which both the first switch M1 and the fourth switch M4 of are in an ON state and concurrently the second switch M2 and the third switch M3 are in an OFF state. As illustrated in FIG. 3C, this causes current to be sourced from a DC-link C1 via one of the DC-bus rails (e.g., the upper DC-bus rail), and the current then flows via the first switch M1, through the motor coil (inductor L1), the fourth switch M4, and to the other one of the DC-bus rails (e.g., the lower DC-bus rail) as indicated by the arrow.

FIG. 3D shows the full bridge circuit during a fourth time or period, in which the first switch M1 is in an ON state, and concurrently all of the second switch M2, the third switch M3, and the fourth switch M4 are in an OFF state. As illustrated in FIG. 3D, this causes current to circulating through the first switch M1, the motor coil (inductor L1), a diode D3 across the third switch M3, and one of the DC-bus rails (e.g., the upper DC-bus rail) as indicated by the arrow.

FIG. 3E shows the full bridge circuit during a fifth time or period, in which both the first switch M1 and the third switch M3 are in an ON state, and concurrently both the second switch M2 and the fourth switch M4 are in an OFF state. As illustrated in FIG. 3E, this causes current to circulate through the first switch M1, the motor coil (inductor L1), the third switch M3, and one of the DC-bus rails (e.g., the upper DC-bus rail) as indicated by the arrow.

At the end of the fifth time or period, the transition from low-side ASC to high-side ASC is complete. Optionally, operation can subsequently switch back from high-side ASC back to low-side ASC.

Figure 4:
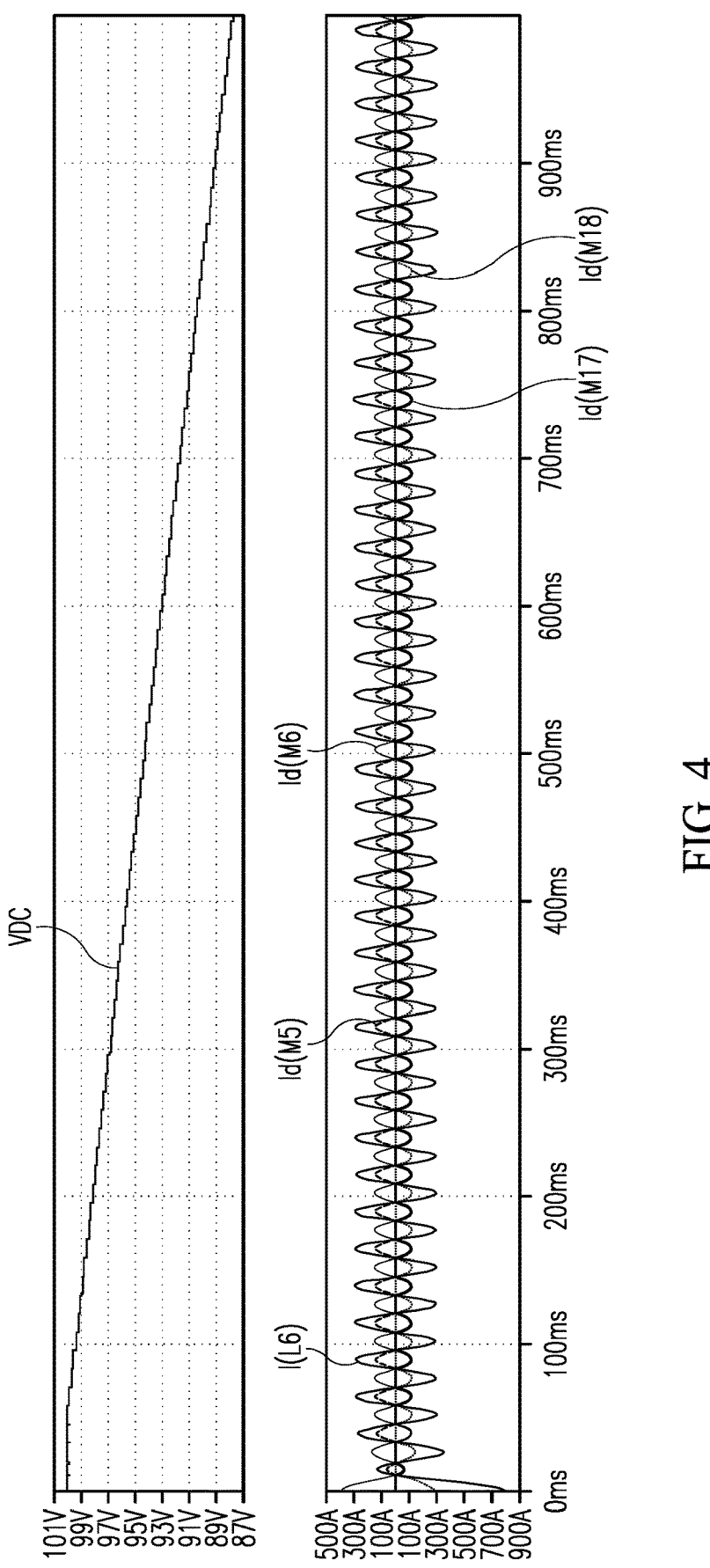
FIG. 4 is a graph showing a simulation of operating a bridge circuit and inductor similar to FIG. 1 according to the control or drive sequence illustrated in FIG. 3A-3E, according to at least one illustrated implementation.

FIG. 4 is a graph 400 showing of a simulation of operating a bridge circuit and inductor of similar to FIG. 1, but with one switch M56, M6, M17, M18 per set of switches (first set of switches S1, second set of switches S2, third set of switches S3, fourth set of switches S4 of FIG. 1), according to the control or drive sequence illustrated in FIG. 3A-3E, according to at least one illustrated implementation.

The graph 400 shows current Id(L6) through the inductor L6. The graph 400 shows current Id(M5) through the first switch M5, current Id(M6) through the second switch M6, current Id(M17) though the third switch M17 and current Id(M18) through the fourth switch M18 over time. From the simulation (LT SPICE simulation) it can be observed that there is no shoot-through, and both the high side switches and the complimentary low side switches are conducting current (at different times). Further, the DC bus voltage VDC is decreasing as this represents an open-circuit test.

Figure 5:
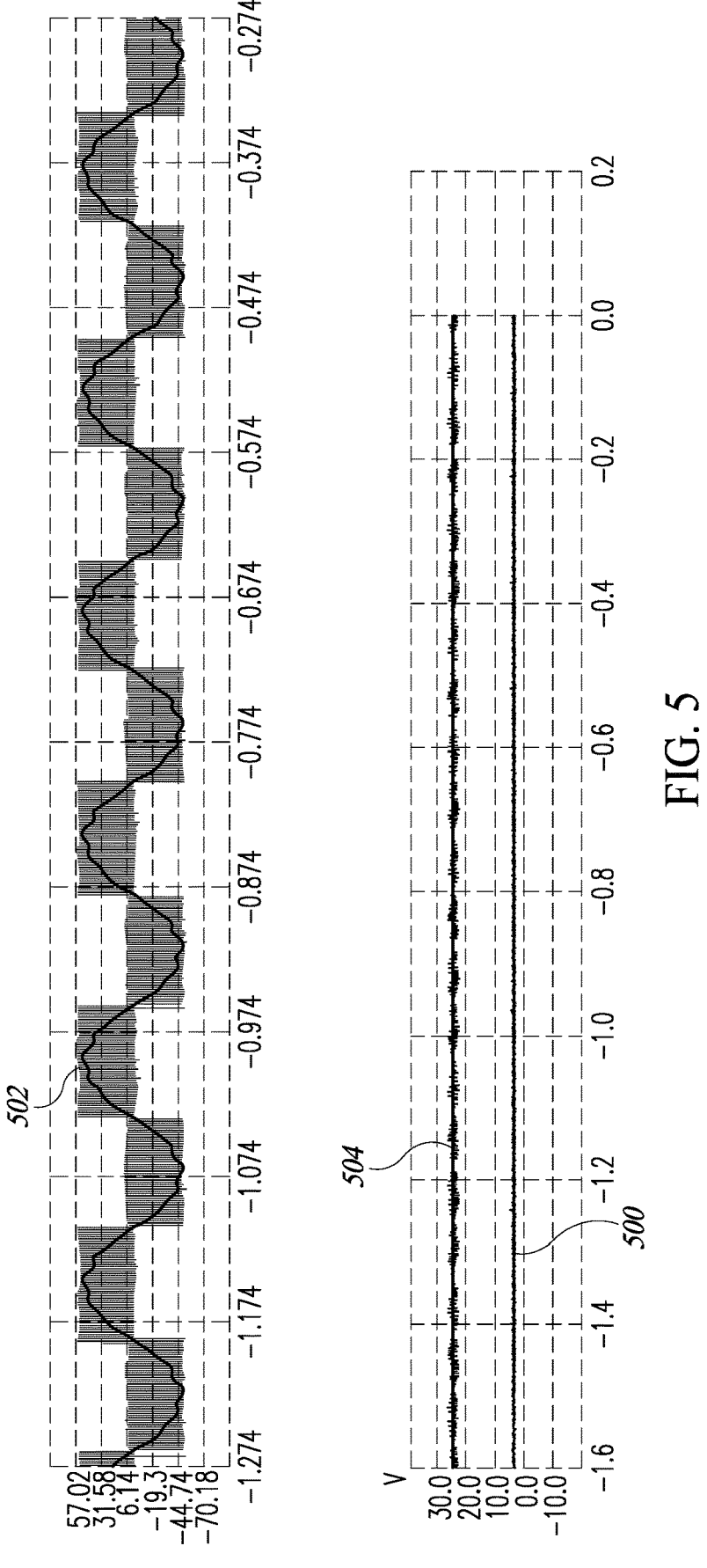
FIG. 5 is a graph illustrating a dynamo testing of a bridge circuit and inductor according to the control or drive sequence illustrated in FIG. 3A-3E, according to at least one illustrated implementation.

FIG. 5 is a graph illustrating a dynamo testing of a bridge circuit and inductor according to the control or drive sequence illustrated in FIG. 3A-3E, according to at least one illustrated implementation.

In particular, FIG. 5 illustrates a dynamo testing performed using an Exro A020 coil driver (full bridge inverter, available from Exro Technologies) and a KO30 electric motor operated at a 70 Hz of commutation frequency. The DC link C4 (FIG. 1)/C1 (FIGS. 3A-3E) was connected, which maintained a steady DC voltage 500. As illustrated in FIG. 5, the ASC waveform 502 is normal, with switching from low-side to high-side and switching back to low side, thus operating as intended. The DC-bus current 504 is approximately 0.6 Amps, indicating that the motor/drive is consuming current. This is expected, and is a very minor amount of power consumption. Further, if the DC-bus was disconnected, the consumption of current would reduce the DC link voltage, as intended and is desirable to ensure not to over-voltage the DC link C4 (FIG. 1)/C1 (FIGS. 3A-3E).

By using the switch sequencing described herein, the full-bridge can advantageously be used to active-short-circuit (ASC) a phase of the electric motor. This can advantageously extend a capability of an inverter/coil-driver to handle twice the ASC currents as compared to a low-side only ASC approach or a high-side only ASC approach. Sequencing the switches is only dependent on phase-current direction, making the approach described herein extremely robust to faults.

Further, a DC-link capacitor C4 (FIG. 1)/C1 (FIGS. 3A-3E) voltage reduction rate can be controlled by controlling a duration of operation of all the switches in the ON state (at third time in act 210 and optionally 2186 in FIG. 2 and as illustrated in FIG. 3C). If the DC-link C4 (FIG. 1)/C1 (FIGS. 3A-3E) is still connected to an external source (e.g., power source), then a small amount of current will be consumed by the inverter/coil-driver and motor. This can advantageously be used to determine whether or not the vehicle has blown a fuse to the inverter, or whether the contactor is open, or additionally or alternatively whether the DC-link C4 (FIG. 1)/C1 (FIGS. 3A-3E) has continuity.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Boolean circuits, Application Specific Integrated Circuits (ASICs) and/or FPGAs. However, those skilled in the art will recognize that the embodiments disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to control systems for electric machines, not necessarily the exemplary systems, methods, and apparatus generally described above.

The various embodiments described above can be combined to provide further embodiments. All of the US patents, US patent application publications, US patent applications, foreign patents, foreign patent applications and non-patent publications referred to in this specification and/or listed in the Application Data Sheet, including but not limited to U.S. patent application Ser. No. 13/393,749, filed May 15, 2012; U.S. Pat. No. 7,081,696; U.S. Patent Application Publication No. 2008088200; U.S. Provisional Patent Application No. 60/094,007, filed Sep. 3, 2008; U.S. Provisional Patent Application Ser. No. 61/239,769, filed Sep. 3, 2009; U.S. Provisional Patent Application No. 63/469,617, filed May 30, 2023; U.S. patent publication No. 2012-0229060; U.S. patent publication No. 2011-0241630; U.S. Pat. No. 8,106, 563; U.S. patent publication No. 2010-0090553; U.S. patent publication No. 2014-0252922; International patent application PCT/CA2018/050222 (published as WO 2018/ 213919); International patent application PCT/CA2019/ 051238 (published as WO 2020/047663); International patent application PCT/CA2022/000039 (published as WO 2023/279196); International patent application PCT/ CA2022/050753); International patent application PCT/

CA2022/051828; International patent application PCT/ CA2022/051830); and U.S. patent application Ser. No. 13/842,213; US Pat. Publ. No. 20230011977A1; US2021/ 0359523; and International Pat. Publ. No. WO2018/213919; US Pat. Publ. No. 2022/0360091 A1 (415); US 2022/ 0368135; US2021/0359523, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

The invention claimed is:

1. A system, comprising:
a full bridge comprising a first switch, a second switch, a third switch and a fourth switch, the first switch and the third switch each electrically coupled to a first voltage rail, the second switch and the fourth switch each electrically coupled to a second voltage rail, the first switch and the second switch electrically coupled to one another at a first node, the third switch and the fourth switch electrically coupled to one another at a second node; and
at least one inductor electrically coupled between the first node and the second node; and
a control circuit coupled to control operation of the first switch, the second switch, the third switch and the fourth switch, and in response to a fault condition sequentially:
cause current to circulate through the second switch, the inductor, the fourth switch, and the second voltage rail;
cause current to circulate through a diode across the second switch, the inductor, the fourth switch, and the second voltage rail;
cause current to pass through the first voltage rail, the first switch, the inductor, the fourth switch, and the second voltage rail;
cause current to circulate through the first switch, the inductor, a diode across the third switch, and the first voltage rail; and
cause current to circulate through the first switch, the inductor, the third switch, and the first voltage rail.

2. The system of claim 1 wherein the control circuit is coupled to cause application of gate signals to control operation of the first switch, the second switch, the third switch and the fourth switch to cause:

at a first time, both the second switch and the fourth switch to be in an ON state and both the first switch and the third switch to be in an OFF state;

at a second time, the fourth switch to be in an ON state and all of the first switch, the second switch and the third switch to be in an OFF state;

at a third time, both the first switch and the fourth switch to be in an ON state and both the second switch and the third switch to be in an OFF state;

at a fourth time, the first switch to be in an ON state and all of the second switch, the third switch and the fourth switch to be in an OFF state; and at a fifth time, both the first switch and the third switch to be in a ON state and both the second switch and the fourth switch in the OFF state.

3. The system of claim 1 wherein the first switch is a first high side switch, the second switch is a first low side switch, the third switch is a second high side switch, and the fourth switch is a second low side switch, the first voltage rail is a high side voltage rail and the second voltage rail is a low side voltage rail, the first high side switch and the second high side switch each electrically coupled to the high side voltage rail, the first low side switch and the second low side switch each electrically coupled to the low side voltage rail, the first high side switch and the first low side switch electrically coupled to one another at the first node, the second high side switch and the second low side switch electrically coupled to one another at the second node.

4. The system of claim 1 wherein the first switch comprises at least a first transistor, the second switch comprises at least a second transistor, the third switch comprises at least a third transistor, and the fourth switch comprises at least a fourth transistor, and the diode across the fourth switch is a body diode of the fourth transistor and the diode across the third switch is a body diode of the third transistor.

5. The system of claim 1 wherein the first switch comprises at least a first pair of transistors electrically coupled in parallel with one another, the second switch comprises at least a second pair of transistors electrically coupled in parallel with one another, the third switch comprises at least a third pair of transistors electrically coupled in parallel with one another, and the fourth switch comprises a fourth pair of transistors electrically coupled in parallel with one another.

6. The system of claim 1 wherein the first switch comprises at least a first transistor, the second switch comprises at least a second transistor, the third switch comprises at least a third transistor, and the fourth switch comprises at least a fourth transistor, and the diode across the fourth switch is a freewheeling diode electrically coupled in anti-parallel across the fourth transistor and the diode across the third switch is a freewheeling diode electrically coupled in antiparallel across the third transistor.

7. The system of claim 1 wherein the control circuit controls operation of the first switch, the second switch, the third switch and the fourth switch to cause current to flow via the second voltage rail and cause current to flow via the first voltage rail without a dead time between.

8. The system of claim 1 wherein the inductor is a coil of one phase of a rotating electric machine with a plurality of permanent magnets.

9. The system of claim 1 wherein the control circuit controls a duration of a time during which current passes through the first voltage rail, the first switch, the inductor, the fourth switch, and the second voltage rail, to control a DC-link capacitor voltage reduction rate.

10. The system of claim 1 wherein the control circuit monitors an amount of current consumed by an inverter/coil-driver and motor to determine whether a DC-link has continuity or not.

11. A method of controlling a full bridge circuit, the full bridge comprising a first switch, a second switch, a third switch and a fourth switch, the first switch and the third switch each electrically coupled to a first voltage rail, the second switch and the fourth switch each electrically coupled to a second voltage rail, the first switch and the second switch electrically coupled to one another at a first node, the third switch and the fourth switch electrically coupled to one another at a second node, with at least one inductor electrically coupled between the first node and the second node, the method comprising:

in response to fault condition sequentially:

causing current to circulate through the second switch, the inductor, the fourth switch, and the second voltage rail;

cause current to circulate through a diode across the second switch, the inductor, the fourth switch, and the second voltage rail;

causing current to pass through the first voltage rail, the first switch, the inductor, the fourth switch, and the second voltage rail;

causing current to circulate through the first switch, the inductor, a diode across the third switch, and the first voltage rail; and causing current to circulate through the first switch, the inductor, the third switch, and the first voltage rail.

12. The method of claim 11 wherein controlling the full bridge circuit includes causing application of gate signals to:

at a first time, placing both the second switch and the fourth switch in an ON state and placing both the first switch and the third switch in an OFF state;

at a second time, placing the fourth switch in an ON state and placing all of the first switch, the second switch and the third switch in an OFF state;

at a third time, placing both the first switch and the fourth switch in an ON state and placing both the second switch and the third switch in an OFF state;

at a fourth time, placing the first switch in an ON state and placing all of the second switch, the third switch and the fourth switch in an OFF state; and at a fifth time, placing both the first switch and the third switch in a ON state and placing both the second switch and the fourth switch OFF state.

13. The method of claim 11 wherein the first switch is a first high side switch, the second switch is a first low side switch, the third switch is a second high side switch, and the fourth switch is a second low side switch, the first voltage rail is a high side voltage rail and the second voltage rail is a low side voltage rail, the first high side switch and the second high side switch each electrically coupled to the high side voltage rail, the first low side switch and the second low side switch each electrically coupled to the low side voltage rail, the first high side switch and the first low side switch electrically coupled to one another at the first node, the second high side switch and the second low side switch electrically coupled to one another at the second node, and the method comprises causing gate drive signals to be applied to the first high side switch, the second high side switch, the first low side switch and the second low side switch.

14. The method of claim 11 wherein the first switch comprises at least a first transistor, the second switch comprises at least a second transistor, the third switch comprises at least a third transistor, and the fourth switch comprises at least a fourth transistor, and the diode across the fourth switch is a body diode of the fourth transistor and the diode across the third switch is a body diode of the third transistor, and the method comprises causing gate drive signals to be applied to the first transistor, the second transistor, the third transistor and the fourth transistor.

15. The method of claim 11 wherein the first switch comprises at least a first transistor, the second switch comprises at least a second transistor, the third switch comprises at least a third transistor, and the fourth switch comprises at least a fourth transistor, and the diode across the fourth switch is an freewheeling diode electrically coupled in antiparallel across the fourth transistor and the diode across the third switch is a freewheeling diode electrically coupled in antiparallel across the third transistor, and the method comprises causing gate drive signals to be applied to the first transistor, the second transistor, the third transistor and the fourth transistor.

16. The method of claim 11 wherein controlling the full bridge circuit includes causing gate signals to be applied to the first switch, the second switch, the third switch and the fourth switch to cause current to flow via the second voltage rail and alternating cause current to flow via the first voltage rail without a dead time between.

17. The method of claim 16 wherein controlling the full bridge circuit includes causing one or more gate drive circuits to generate gate drive signals to be applied to the first switch, the second switch, the third switch and the fourth switch to cause the current to flow via the second voltage rail and cause current to flow via the first voltage rail without a dead time between.

18. The method of claim 11, further comprising:
controlling a duration of a time during which current passes through the first voltage rail, the first switch, the inductor, the fourth switch, and the second voltage rail, to control a DC-link capacitor voltage reduction rate.

19. The method of claim 11, further comprising:
monitoring an amount of current consumed by an inverter/coil-driver and motor to determine whether a DC-link has continuity or not.

20. A non-transitory computer-readable medium that stores processor-executable instructions for use in controlling a full bridge circuit, the full bridge comprising a first switch, a second switch, a third switch and a fourth switch, the first switch and the third switch each electrically coupled to a first voltage rail, the second switch and the fourth switch each electrically coupled to a second voltage rail, the first switch and the second switch electrically coupled to one another at a first node, the third switch and the fourth switch electrically coupled to one another at a second node, with at least one inductor electrically coupled between the first node and the second node, the processor-executable instructions, when executed by at least one processor:
in response to fault condition sequentially:
cause current to circulate through the second switch, the inductor, the fourth switch, and the second voltage rail;
cause current to circulate through a diode across the second switch, the inductor, the fourth switch, and the second voltage rail;
cause current to pass through the first voltage rail, the first switch, the inductor, the fourth switch, and the second voltage rail;
cause current to circulate through the first switch, the inductor, a diode across the third switch, and the first voltage rail; and
cause current to circulate through the first switch, the inductor, the third switch, and the first voltage rail.

21. The computer-readable medium of claim 20 wherein the processor-executable instructions, when executed by the at least one processor, cause the at least one processor to cause application of gate signals to:
at a first time, place both the second switch and the fourth switch in an ON state and placing both the first switch and the third switch in an OFF state;
at a second time, place the fourth switch in an ON state and placing all of the first switch, the second switch and the third switch in an OFF state;
at a third time, place both the first switch and the fourth switch in an ON state and placing both the second switch and the third switch in an OFF state;
at a fourth time, place the first switch in an ON state and placing all of the second switch, the third switch and the fourth switch in an OFF state; and
at a fifth time, place both the first switch and the third switch in a ON state and placing both the second switch and the fourth switch OFF state.

22. The computer-readable medium of claim 20 wherein the processor-executable instructions, when executed by the at least one processor, cause the at least one processor to cause application of gate signals to the first switch, the second switch, the third switch and the fourth switch to cause current to flow via the second voltage rail and alternating cause current to flow via the first voltage rail without a dead time between.

* * * * *